April 24, 1962 J. J. RIBBENS ETAL 3,031,088
SUSPENSION FRAMEWORK
Filed May 9, 1960 2 Sheets-Sheet 1
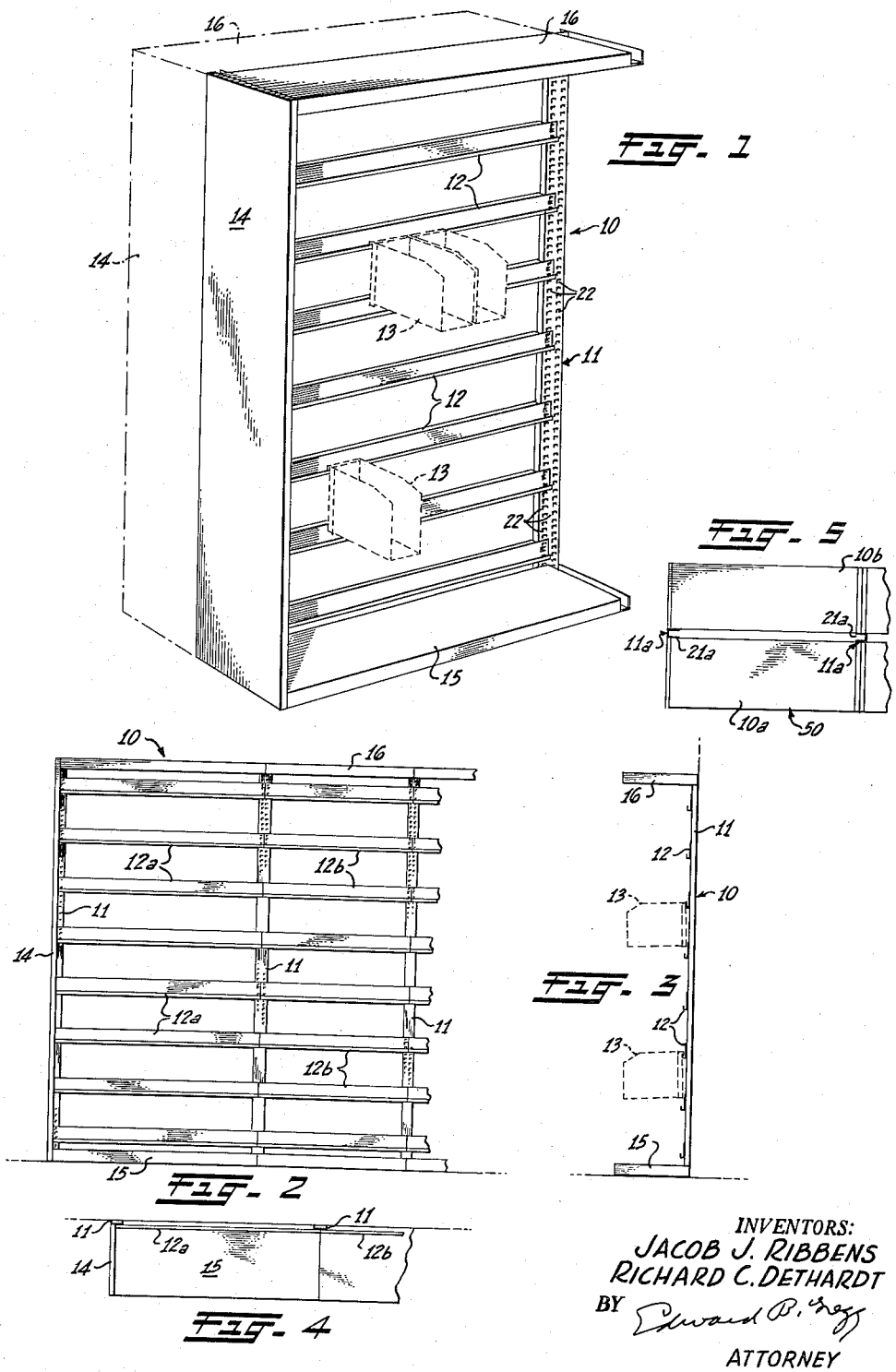
INVENTORS:
JACOB J. RIBBENS
RICHARD C. DETHARDT
BY
ATTORNEY April 24, 1962 J. J. RIBBENS ETAL 3,031,088
SUSPENSION FRAMEWORK
Filed May 9, 1960 2 Sheets-Sheet 2

INVENTORS:
JACOB J. RIBBENS
RICHARD C. DETHARDT
BY
ATTORNEY

United States Patent Office 3,031,088
Patented Apr. 24, 1962

3,031,088
SUSPENSION FRAMEWORK
Jacob J. Ribbens, Mayville, and Richard C. Dethardt, Brownsville, Wis., assignors to Tab Products Co., San Francisco, Calif., a corporation of California
Filed May 9, 1960, Ser. No. 27,701
14 Claims. (Cl. 211—176)

This invention relates to a suspension filing rack.

More particularly this invention relates to a filing rack comprising vertical frame members and cross members in the form of rails which act as transverse frame members and also as suspension means for hanging file containers.

There is a need for filing racks of simple inexpensive construction which can be put together and taken down easily; which can be shipped and stored in disassembled, compact condition; which can be assembled into operating condition very quickly and easily; which are easily adjustable; and which are capable of supporting numerous file containers filled with files. These objects are not adequately fulfilled for all purposes by cabinet type files. For example, cabinet type filing equipment is not easy to assemble and disassemble.

It is an object of the present invention to provide an improved suspension filing rack of the general character described.

It is a particular object of the invention to provide a suspension filing rack of the character and for the purpose described in which the transverse members which serve as suspension rails can be readily attached to and detached from the vertical members without the need for nuts, bolts, screws and the like.

Another particular object of the invention is to provide a filing rack of the character and for the purpose described comprising vertical members, horizontal members which serve also as suspension rails and a quick, easy and secure means for attaching the horizontal members to the vertical members, the design of said rails and the means of attaching them to the vertical members being such that a sturdy framework is provided which has very little tendency to sway.

A more general object is to provide a vertical framework of substantial size, for supporting files or for other purposes, which is characterized by a quick connect-disconnect means between the vertical and horizontal members and which is rigid and sway-proof.

The above and other objects of the invention will be apparent from the ensuing description and the appended claims.

One form of the invention is shown in the accompanying drawings, in which:

FIGURE 1 is a front perspective view of a filing rack constructed in accordance with the invention.

FIGURE 2 is a fragmentary view in front elevation of a similar filing rack but showing how individual units can be joined end-to-end.

FIGURE 3 is an end view of a filing rack in accordance with our invention.

FIGURE 4 is a top plan view of the filing rack of FIGURE 2 with the cover removed.

FIGURE 5 is a top plan view of a modification in which two filing racks are assembled and united in back-to-back relation.

Figure 6:
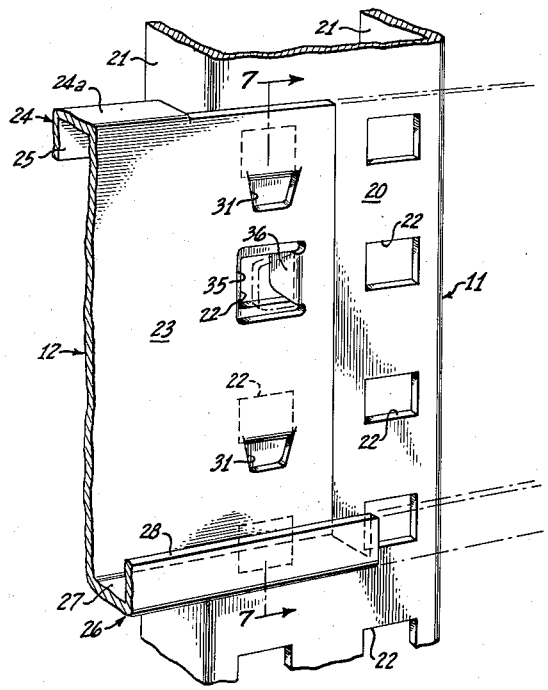
FIGURE 6 is a fragmentary, enlarged perspective view showing the means of attachment of the horizontal members or suspension rails to the vertical member.

Referring now to the drawings and preliminarily to FIGURE 1, a suspension frame or filing rack is there shown which is generally designated by the reference numeral 10. It comprises a pair of vertical members 11 (one of which is shown, the other being concealed) and a larger number of horizontal members or suspension rails 12. Several file containers 13 are shown suspended from the suspension rails 12. One such file container is shown in more detail in FIGURE 7 and is described hereinafter. The file containers 13 may be of any suitable construction, for example of the type described and claimed in our copending application Serial No. 27,722, filed May 9, 1960, entitled "Collapsible File Holder."

The filing rack 10 shown in FIGURE 1 also comprises a side wall 14, a bottom member or base 15 and a top member or cover 16. The right-hand end of the filing rack is shown open in FIGURE 1 but it may also be closed by a side wall such as that shown at 14. The particular design, construction and means of attachment of the base 15, the cover 16 and the side wall 14 may vary considerably. For example, nuts and bolts may be used, or the vertical members may simply rest in or on the base. Also the cover may simply rest on top of the vertical members.

Figure 7:
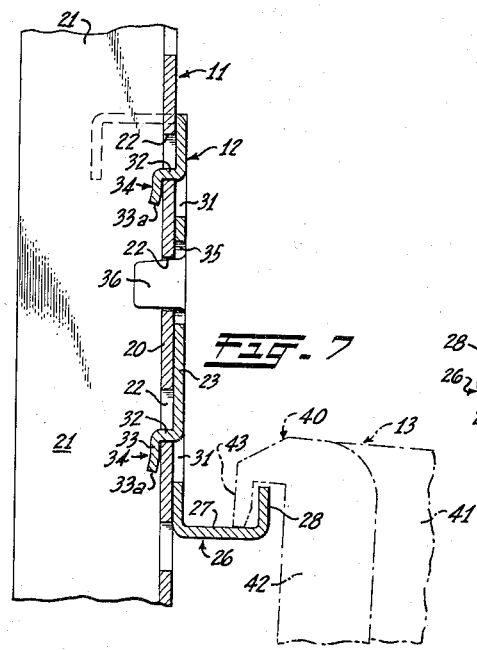
FIGURE 7 is a section taken along the line 7—7 of FIGURE 6 showing also a file container suspended from the suspension rail.
Figure 8:
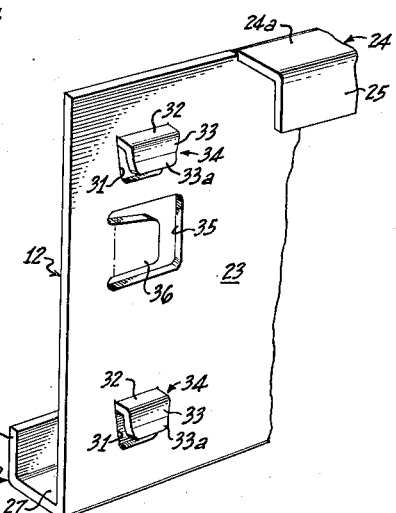
FIGURE 8 is a rear view of the suspension rail shown in FIGURE 6.

Referring now to FIGURES 6, 7 and 8, one of the vertical members 11 is there shown. As will be apparent, it is channel-shaped and it comprises a face or web portion 20 and two wings or flange portions 21. The face portion or web 20 is formed with two rows of holes 22 which are preferably uniformly spaced and which are arranged in horizontally aligned pairs. As will be seen, the horizontal member or suspension rail 12 has a face or body portion 23 and at its top it is formed with a channel 24 having a horizontal and rearwardly projecting portion 24a and a downwardly projecting lip 25. As will be seen the channel 24 is spaced at its ends from the adjacent posts 11. That is, the channel 24 does not abut the vertical members 11. At its lower edge the suspension rail 12 is formed into a channel 26 which is formed by a horizontal, forwardly projecting portion 27 and an upwardly projecting lip portion 28. As best shown in FIGURES 6 and 8 the suspension rail 12 is formed at each end with vertically aligned upper and lower holes 31 which taper downwardly. The metal punched to form each hole 31 is bent rearwardly at 32 and downwardly at 33 to form a hook member or suspension bracket 34. Each end of the suspension rail 12 is also formed with a hole 35. A part of the metal is punched out completely to form the hole 35 but a part remains as a locking ear 36 which has a tapered shape as shown.

In mounting a horizontal rail 12 on a pair of spaced vertical members 11 the rail 12 is lifted so that the tongue portions 33 of the suspension brackets 34 will clear the bottom edges of the selected holes 22. The suspension rail 12 is then pushed toward the faces 20 of the vertical members 11 so that the brackets 34 will pass through the selected holes 22. The suspension rail is then forced down so that the horizontal portions 32 of the brackets 34 rest on the bottom edges of the selected holes 22. It will be noted that the top, horizontal portions 32 of the brackets 34 are relatively wide. Therefore they will wedge into the holes 22 and will form a snug fit which prevents any play or looseness in a longitudinal direction. That is to say, there will be a snug fit of the suspension rail 12 and its supporting members 11 in relation to a force acting along the length of the suspension rail 12.

In inserting the brackets 34 in the manner described it will be noted that the tips 33a thereof are bent outwardly which facilitates guiding them into the selected holes 22.

The placement of each locking ear 36 is such that, when a rail 12 has been mounted in the manner described, it will be in registry with the hole 22 which is between the holes 22 which receive the brackets 34. A hammer, a pair of pliers, a screwdriver or any other suitable tool is then employed to bend the ear 36 at each end of the rail 12 inwardly to the position shown in FIGURES 6 and 7. The tongue 36 is tapered at its upper edge so that its outer end will pass freely through the adjacent hole 22 but when it is bent sufficiently the wider base of the ear 36 will wedge in the respective hole 22 and will act to force the rail 12 down and clamp it tightly in place. By this means the suspension rail 12 is locked against vertical displacement as well as against horizontal displacement.

Whenever it is desired to remove a suspension rail 12, a suitable tool is employed to bend or hammer the locking ears 36 back to the position shown in FIGURE 8. The rail is lifted and is then pulled out to detach the brackets 34 from their respective holes 22.

Referring now to FIGURE 7, the upper corner of a file container 13 is there shown. It will be seen that it comprises a body 41 which is preferably of cardboard construction, and a rear closure and suspension member 40 which is preferably of plastic construction. The rear member 40 has a body portion 42 and a hook portion 43. The hook portion 43 straddles the lip 28 of the channel 26. By this means it will be apparent that file containers such as that shown at 13 in FIGURES 1, 3 and 7 can be suspended from the suspension rails 12 and can be moved longitudinally by sliding them along the channels 26. As stated the file container 13 may be of any desired construction, for example as described and claimed in our copending application Serial No. 27,722, entitled Collapsible File Folder, filed May 9, 1960.

Referring now to FIGURE 2, suspension rails 12a and 12b are there shown which are identical with each other and with the rail 12 shown in FIGURES 1 and 6 to 8, except that the rail 12a is longer than the rail 12b. For example, the rail 12a may be 42 inches in length and the rail 12b 30 inches in length. By making combinations of these lengths of rail it is possible to make maximum use of wall space or the space available for files, thus avoiding the necessity of stocking a large assortment of lengths of rail and of making rails of special length.

Referring to FIGURE 5 a double filing rack 50 is there shown comprising two individual filing racks 10a and 10b arranged in back-to-back relation. The construction of the filing rack 50 is identical with that shown in FIGURE 1 except that the vertical members 11a are deeper channels and they are turned 90° in relation to the position of the vertical members 11 in FIGURES 1 and 6. The side portions or wings 21a of each vertical member 11a are slotted in the same manner as the face portion 20 in FIGURE 6. That is to say, instead of slotting the web or face portion 20 as in FIGURE 6 each side portion or wing 21a is slotted so that rails 12 can be suspended from both sides.

For strength and stability the rails 12 and vertical members 11 are preferably constructed of heavy gauge metal, e.g., 14 gauge and 12 gauge, respectively. Steel or strong aluminum alloys are suitable materials. To provide vertical stability, i.e., to prevent toppling over of the vertical framework, a base such as that shown at 15 may be employed, or the vertical framework may be fastened by any suitable means to a wall, or a double, back-to-back file such as shown in FIGURE 5 may be employed.

It will be apparent that the rails 12, or 12a and 12b, can be adjusted as to number and spacing, and that this can be done very quickly and easily.

It will, therefore, be apparent that a novel suspension filing rack is provided which is very simple in its design, which can be shipped and stored in knocked-down, disassembled, compact condition, which can be assembled readily and easily without the need to use nuts or bolts or any other similar means of attachment, which can be readily disassembled when desired, which is very sturdy and strong, which is stable against swaying and which is adjustable for a variety of needs.

We claim:

1. A vertical framework comprising a pair of horizontally spaced vertical members having a pair of faces located in the same vertical plane, each said face being formed with mounting holes for reception of mounting brackets, said holes being arranged in a vertical column and being uniformly spaced, and at least one horizontal member extending between said vertical members, each end of said horizontal member being formed with a pair of projecting mounting brackets arranged in vertical alignment and spaced apart a distance equal to twice the spacing of said mounting holes, and a locking ear located midway between said mounting brackets, said locking ear being capable of bending transversely to said mounting brackets to lock said horizontal member against vertical displacement, said brackets and ear being located in their respective mounting holes to clamp and lock the horizontal member against vertical and horizontal displacement and to limit swaying of said vertical members.

2. A vertical framework comprising a pair of horizontally spaced vertical members having a pair of faces located in the same vertical plane, each said face being formed with mounting holes for reception of mounting brackets, said holes being arranged in a vertical column and being uniformly spaced, and at least one horizontal member extending between said vertical members, each end of said horizontal member being formed with a pair of inverted angle-shaped mounting brackets wedgeable in said mounting holes and an ear bendable about a vertical axis to form a projecting vertical member, said brackets and said ear being arranged in vertical alignment and with a spacing equal to the spacing of said mounting holes, said horizontal member being mounted on said vertical members with its mounting brackets and ears fitted in mounting holes of the vertical members.

3. The vertical framework of claim 2 wherein said horizontal member is formed at its lower edge with an upwardly opening and forwardly projecting channel.

4. A vertical framework of the character described comprising a pair of vertical members each having a perforated face, said perforated faces being arranged in the same vertical plane, the perforations in each said face being in the form of a vertical row of uniformly spaced mounting holes; and at least one horizontal member having at each end a projecting mounting bracket projecting in the direction of the respective vertical member, said horizontal member having also at each end a locking ear in vertical alignment with the respective bracket and which is spaced from said bracket a distance equal to the spacing of said mounting holes, said locking ear being capable of bending between a flush position wherein it does not project and a projecting position; said vertical and horizontal members being assembled with the mounting bracket at each end of the horizontal member received in a mounting hole in one of said vertical members and with the respective locking ear received in an adjacent mounting hole, the arrangement of said bracket and locking ear being such that the bracket resists lateral displacement and the locking ear resists vertical displacement of the horizontal member in relation to the respective vertical member.

5. A vertical framework of the character described comprising a pair of vertical members each having a perforated face, said perforated faces being arranged in the same vertical plane, the perforations in each said face being in the form of a vertical row of uniformly spaced mounting holes; and at least one horizontal member having at each end a pair of rearwardly projecting, downwardly opening mounting brackets arranged in vertical alignment and spaced apart a distance equal to twice the spacing of said mounting holes, said horizontal member having also at each end a locking ear which is located half way between and in alignment with the respective mounting brackets, said locking ear being capable of being bent about a vertical axis between a flush position and a rearwardly projecting position; said vertical and horizontal members being assembled with the mounting brackets at each end of the horizontal member received in a pair of holes in one of said vertical members and the respective locking ear received in an intermediate mounting hole.

6. A suspension framework of the character described comprising a pair of horizontally spaced vertical members each formed with a column of vertically aligned, uniformly spaced mounting holes, and at least two horizontal rails attached to said vertical members in vertically spaced relation, each said rail having an upwardly open, forwardly projecting channel at its lower edge adapted to slidably receive and support file holders and the like; each said horizontal rail having at each end at least one mounting bracket and at least one mounting ear spaced apart so that said mounting members are received in different mounting holes on said vertical member, said mounting ear being bendable about a vertical axis between a non-projecting position and a rearwardly extended projecting position for reception by one of said mounting holes, said bracket providing vertical support for said horizontal member and acting to limit lateral displacement and said ear acting to limit vertical displacement.

7. A suspension filing rack of the character described comprising a plurality of horizontally spaced vertical members and at least two vertically spaced horizontal members connected to said vertical members to form a vertical framework; each said vertical member being formed with a pair of columns of vertically aligned, uniformly spaced mounting holes; each said horizontal member comprising a vertical, longitudinally extended body portion and a channel-shaped hanger portion at the lower edge thereof projecting forwardly from the body portion, each said horizontal member also having at each end mounting and locking means in the form of a rearwardly projecting, inverted angle-shaped bracket and a vertical ear bendable between a non-projecting position and a rearwardly projecting position, said bracket and ear being in vertical alignment with a spacing therebetween equal to the spacing of said mounting holes and being so arranged that the bracket is received in a mounting hole when said ear is in its non-projecting position to provide vertical support for the horizontal member and the ear is bent into its projecting position and thereby is received in an adjacent mounting hole to resist lifting of the horizontal member.

8. The filing rack of claim 7 wherein said horizontal member is formed at its upper edge with a rearwardly projecting inverted channel.

9. A suspension filing framework of the character described comprising a plurality of channel-shaped vertical members each having a front face formed with a double column of vertically aligned, uniformly spaced mounting holes, said faces being arranged in the same vertical plane; and a plurality of horizontal rails including at least one upper rail and one lower rail between and attached to each pair of vertical members; each said rail being formed with a forwardly projecting, upwardly open channel at its lower edge for sliding support of file holders and the like; each said rail being also formed at each end, in registry with a column of mounting holes on the respective vertical member, with connecting means including an inverted angle bracket and a vertical ear arranged in vertical alignment, said bracket being received by one of sadi mounting holes and said ear being bendable between a projecting and a non-projecting position with respect to another of said mounting holes, said ear being bent into its projecting position into a mounting hole for securing said rail to said vertical member and being bent into its non-projecting position for removal of said rail from said vertical member.

10. A combined structural member and suspension rail of the character described comprising a longitudinally extended body portion formed at its lower edge with a forwardly projecting, upwardly opening channel for sliding support of file holders and the like, each end of said body portion being formed with connecting means in the form of a rearwardly projecting, downwardly opening, angle-shaped bracket and an ear vertically aligned with said bracket and bendable about a vertical axis between a first position wherein it is flush with said body position and a rearwardly projecting, locking position.

11. The structure of claim 10 wherein said body portion is formed with a rearwardly projecting channel along its upper edge.

12. The structure of claim 10 wherein each said connecting means is tapered to effect a wedging action when it is seated in a mounting hole in a cooperable vertical member.

13. A vertical, rigid, sway-proof framework of the character described for suspending file containers and the like, said framework having a relatively large height and length and a shallow depth, said framework being formed by at least two horizontally spaced vertical members and at least two vertically spaced horizontal members attached to the vertical members, each said vertical member having a front face formed with a vertical row of holes, said faces being in a common vertical plane and the holes of each row being spaced uniformly apart; each said horizontal member having a front face portion formed at each end with a rearwardly and horizontally projecting bracket and with a rearwardly and vertically projecting ear, said bracket and said ear being in vertical alignment and being spaced apart so as to be received in two of said mounting holes, said bracket being received in one such hole and serving to provide vertical support for the horizontal member and to prevent lateral displacement thereof and said ear being received in another of said mounting holes and serving to prevent vertical displacement thereof; said framework being devoid of cross braces other than said horizontal members and being devoid of connecting means between the horizontal and vertical members other than said brackets and ears; said framework being rigid and substantially sway-proof due to moments about the joints between the horizontal and vertical members.

14. A vertical, rigid, sway-proof framework of the character described adapted to suspend file containers and the like and having a relatively large height and length and a relatively shallow depth, said framework comprising a pair of outer vertical members and an interior vertical member between and spaced from said outer members; a first set of horizontal members extending between and connected to one of the outer vertical members and said interior member and a second set of horizontal members extending between and connected to the other of said outer vertical members and said interior member; each said outer member being formed with a vertical row of uniformly spaced mounting holes and said interior member being formed with two vertical rows of uniformly spaced mounting holes, said mounting holes being arranged in the same vertical plane; each end of each horizontal member being formed with a rearwardly projecting horizontal bracket and with a rearwardly projecting vertical ear spaced apart a distance such that the bracket registers with one of said mounting holes and the ear registers with another of said mounting holes; the bracket and the ear at the outer end of each horizontal member being received in mounting holes in the respective outer vertical member and the bracket and the ear at the inner end of each horizontal member being received in mounting holes of the nearer row of such holes of the interior vertical member; said brackets serving to provide vertical support and to prevent lateral displacement of the horizontal members; said ears serving to prevent vertical displacement of said horizontal members.

References Cited in the file of this patent

UNITED STATES PATENTS

| | | |
|---|---|---|
| 2,302,194 | Dayton | Nov. 17, 1942 |
| 2,589,304 | Spangler | Mar. 18, 1952 |
| 2,633,652 | Wagner | Apr. 7, 1953 |
| 2,784,812 | Kindorf | Mar. 12, 1957 |
| 2,895,619 | Frazier | July 21, 1959 |
| 2,925,181 | Saul | Feb. 16, 1960 |
| 2,974,807 | Furrer | Mar. 14, 1961 |

FOREIGN PATENTS

| | | |
|---|---|---|
| 662,108 | Great Britain | Nov. 28, 1951 |